United States Patent
Luyks (10) Patent No.: US 8,775,078 B1
(45) Date of Patent: Jul. 8, 2014

(54) VEHICLE NAVIGATION USING CELLULAR NETWORKS

(71) Applicant: The Boeing Company, Chicago, IL (US)

(72) Inventor: Leo J. Luyks, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/950,039

(22) Filed: Jul. 24, 2013

Related U.S. Application Data (63) Continuation of application No. 13/688,013, filed on Nov. 28, 2012, now Pat. No. 8,521,427.

(51) Int. Cl.
  *G01C 21/26* (2006.01)
  *G01C 21/20* (2006.01)
  *G01C 21/16* (2006.01)
  *G01C 21/00* (2006.01)

(52) U.S. Cl.
  CPC .............. *G01C 21/00* (2013.01); *G01C 21/165* (2013.01)
  USPC ............. 701/500; 701/24; 455/83; 455/575.9

(58) Field of Classification Search
  CPC .. H04W 64/00; H04L 29/08657; G01C 21/16
  USPC ............. 701/23, 24, 213, 220, 400, 500, 503, 701/504, 505, 506, 507, 509, 510, 511, 701/512; 455/73, 83, 553.1, 575.7, 575.9, 455/422.1, 456.5, 456.6; 340/426.1, 426.2
  See application file for complete search history.

(56) References Cited

U.S. PATENT DOCUMENTS

| | | | | |
|---|---|---|---|---|
| 6,285,339 | B1 * | 9/2001 | McGill | 343/882 |
| 6,336,075 | B1 * | 1/2002 | Park et al. | 701/515 |
| 7,541,766 | B1 * | 6/2009 | Sato et al. | 318/630 |
| 2004/0148091 | A1 * | 7/2004 | Masclet et al. | 701/200 |
| 2004/0233116 | A1 * | 11/2004 | Desargant et al. | 343/757 |
| 2006/0132371 | A1 * | 6/2006 | Jeon et al. | 343/757 |
| 2006/0181472 | A1 * | 8/2006 | Baird et al. | 343/776 |

(Continued)

FOREIGN PATENT DOCUMENTS

GB    2247128 A  *  2/1992

*Primary Examiner* — Mary Cheung
*Assistant Examiner* — Rodney Butler
(74) *Attorney, Agent, or Firm* — Vista IP Law Group LLP; Cynthia A. Dixon (57) ABSTRACT

The present disclosure provides a method for navigation of a vehicle using cellular networks that involves determining, with an inertial navigation system, a vehicle location estimate. The method also involves transmitting, with a transmit antenna, a transmit signal to the cellular tower requesting a cell identification (CID); and receiving, with a receive antenna, a receive signal from the cellular tower containing the CID. Further, the method involves determining the cellular tower location by looking up the CID in a lookup table; determining a difference in time from the time the transmit signal was sent to the time the receive signal was received; calculating the distance from the vehicle to the cellular tower by using the time difference; and refining the vehicle location estimate by using the cellular tower location, the distance from the vehicle to the cellular tower, and the angle of the transmit antenna and the receive antenna.

20 Claims, 4 Drawing Sheets

(56) References Cited

U.S. PATENT DOCUMENTS

| | | | |
|---|---|---|---|
| 2011/0018736 A1* | 1/2011 | Carr | 340/902 |
| 2011/0066364 A1* | 3/2011 | Hale | 701/201 |
| 2012/0078501 A1* | 3/2012 | Haleem | 701/408 |
| 2012/0135747 A1* | 5/2012 | Seder et al. | 455/456.1 |
| 2012/0172054 A1* | 7/2012 | Waters et al. | 455/456.1 |
| 2013/0002456 A1* | 1/2013 | Fuller et al. | 340/990 |
| 2013/0035093 A1* | 2/2013 | Doyle | 455/426.1 |
| 2013/0150053 A1* | 6/2013 | Hwang et al. | 455/440 |

* cited by examiner

VEHICLE NAVIGATION USING CELLULAR NETWORKS

CROSS-REFERENCE TO RELATED APPLICATION

This application is a Continuation application of, and claims the benefit of, U.S. patent application Ser. No. 13/688,013, filed Nov. 28, 2012, which is hereby incorporated by reference in its entirety.

BACKGROUND

The present disclosure relates to vehicle navigation. In particular, it relates to vehicle navigation using cellular networks.

Currently, vehicle navigation systems utilize a Global Positioning System (GPS) receiver to aid an inertial navigation system (INS) system to determine the vehicle navigation data, which is used to determine the location of the vehicle. In the past, other sensors have been employed to provide navigation data assistance, such as sun sensors, star trackers, and Earth horizon sensors. But, these sensors each have their various disadvantages. The disclosed system, method, and apparatus provide an approach to the problem of vehicle navigation determination without the aid of GPS, which is susceptible to loss, jamming, and spoofing.

SUMMARY

The present disclosure relates to a method, system, and apparatus for a vehicle navigation using cellular networks. In one or more embodiments, the present disclosure teaches a method for navigation of a vehicle using cellular networks. The disclosed method involves determining, with an inertial navigation system, an estimate of a location of the vehicle. The method further involves steering, by a controller, a transmit antenna and a receive antenna at an angle such that they are both pointed towards a cellular tower. Also, the method involves transmitting, with the transmit antenna, a transmit signal to the cellular tower requesting for a cell identification (CID) of the cellular tower. In addition, the method involves receiving, with the receive antenna, a receive signal from the cellular tower containing the CID of the cellular tower. Additionally, the method involves determining, with at least one digital computer, the location of the cellular tower by looking up the CID of the cellular tower in a lookup table. Also, the method involves determining, with at least one digital computer, a difference in time from the time the transmit signal was sent by the transmit antenna to the time the receive signal was received by the receive antenna. Additionally, the method involves calculating, with at least one digital computer, the distance from the vehicle to the cellular tower by using the difference in time. Further, the method involves refining, with at least one digital computer, the estimate of the location of the vehicle by using the location of the cellular tower, the distance from the vehicle to the cellular tower, and the angle of the transmit antenna and the receive antenna.

In one or more embodiments, the vehicle is a space vehicle, a satellite, an aircraft, a missile, a marine vehicle, or a terrestrial vehicle. In at least one embodiment, the transmit antenna and the receive antenna are each a single reflector antenna, a multi-reflector antenna, a phased array antenna, a multi-feed array antenna, or a phased array fed reflector antenna. In some embodiments, when the transmit antenna and the receive antenna are each a single reflector antenna or a multi-reflector antenna, the steering is performed by gimballing at least one of their reflector(s). In one or more embodiments, the transmit antenna and the receive antenna are housed on the vehicle. In some embodiments, the location of the cellular tower is specified in the lookup table in one of two dimensions (2D) and three dimensions (3D).

In at least one embodiment, the method further involves determining, by at least one digital computer, which cellular tower to point towards by algorithmically choosing the cellular tower that will provide the best accuracy to refine the estimate of the location of the vehicle. In one or more embodiments, the method further comprises updating the lookup table by adding new CIDs to the lookup table, deleting CIDs that are no longer used from the lookup table, and/or correcting the location of at least one cellular tower corresponding to a CID in the lookup table. In some embodiments, at least one digital computer utilizes a Kalman filter to refine the estimate of the location of the vehicle. In at least one embodiment, the steering of the transmit antenna and the receive antenna at the angle such that they are both pointed towards the cellular tower is based on an amplitude of the receive signal.

In one or more embodiments, a system for navigation of a vehicle using cellular networks is disclosed. The disclosed system involves an inertial navigation system to determine an estimate of a location of the vehicle. The system further involves a controller to steer a transmit antenna and a receive antenna at an angle such that they are both pointed towards a cellular tower. Also, the system involves the transmit antenna to transmit a transmit signal to the cellular tower requesting for a cell identification (CID) of the cellular tower. In addition, the system involves the receive antenna to receive a receive signal from the cellular tower containing the CID of the cellular tower. Further, the system involves at least one digital computer to determine a location of the cellular tower by looking up the CID of the cellular tower in a lookup table; to determine the difference in time from the time the transmit signal was sent by the transmit antenna to the time the receive signal was received by the receive antenna; to calculate a distance from the vehicle to the cellular tower by using the difference in time; and to refine the estimate of the location of the vehicle by using the location of the cellular tower, the distance from the vehicle to the cellular tower, and the angle of the transmit antenna and the receive antenna.

In at least one embodiment, at least one digital computer also determines which cellular tower to point towards by algorithmically choosing the cellular tower that will provide the best accuracy to refine the estimate of the location of the vehicle. In some embodiments, the lookup table is configured to be updated by adding new CIDs to the lookup table, by deleting CIDs that are no longer used from the lookup table, and/or by correcting the location of at least one cellular tower corresponding to a CID in the lookup table. In one or more embodiments, at least one digital computer utilizes a Kalman filter to refine the estimate of the location of the vehicle.

In one or more embodiments, an apparatus for navigation of a vehicle using cellular networks is disclosed. The disclosed apparatus involves an inertial navigation system to determine an estimate of a location of the vehicle. The apparatus further involves a controller to steer a transmit antenna and a receive antenna at an angle such that they are both pointed towards a cellular tower. In addition, the apparatus involves the transmit antenna to transmit a transmit signal to the cellular tower requesting for a cell identification (CID) of the cellular tower. Additionally, the apparatus involves the receive antenna to receive a receive signal from the cellular tower containing the CID of the cellular tower. Further, the apparatus involves at least one digital computer to determine a location of the cellular tower by looking up the CID of the cellular tower in a lookup table; to determine the difference in time from the time the transmit signal was sent by the transmit antenna to the time the receive signal was received by the receive antenna; to calculate the distance from the vehicle to the cellular tower by using the difference in time; and to refine the estimate of the location of the vehicle by using the location of the cellular tower, the distance from the vehicle to the cellular tower, and the angle of the transmit antenna and the receive antenna.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for vehicle navigation using cellular networks. Specifically, this system provides navigation, for various types of vehicles (e.g., space vehicles, marine vehicles, and terrestrial vehicles) and missiles, by using terrestrial cellular data networks. Vehicle navigation is accomplished by use of inertial navigation, from an inertial navigation system (INS), in conjunction with measurements made from cellular network ground-based stations. Specifically, a vehicle mounted radio frequency (RF) system with a tracking antenna is employed to obtain navigation state information in conjunction with navigation information from an inertial guidance system (i.e. an INS) to form a system that does not rely on the aid of Global Positioning System (GPS) information.

The disclosed system and method provide vehicle and missile navigation independent of GPS assistance. The present disclosure provides a reliable determination of vehicle position, velocity, and attitude. This disclosed system and method can be used while a space vehicle is in-orbit or over-flight of terrestrial cellular data networks. The present disclosure provides an independent means of vehicle navigation data that is used to update and to correct for inertial system errors without the susceptibility to GPS jamming and spoofing. In addition, the present disclosure allows for improvement in navigation accuracy over pure INS solutions in GPS denied areas, or in the event of GPS constellation unavailability or simply a desire not to use GPS.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
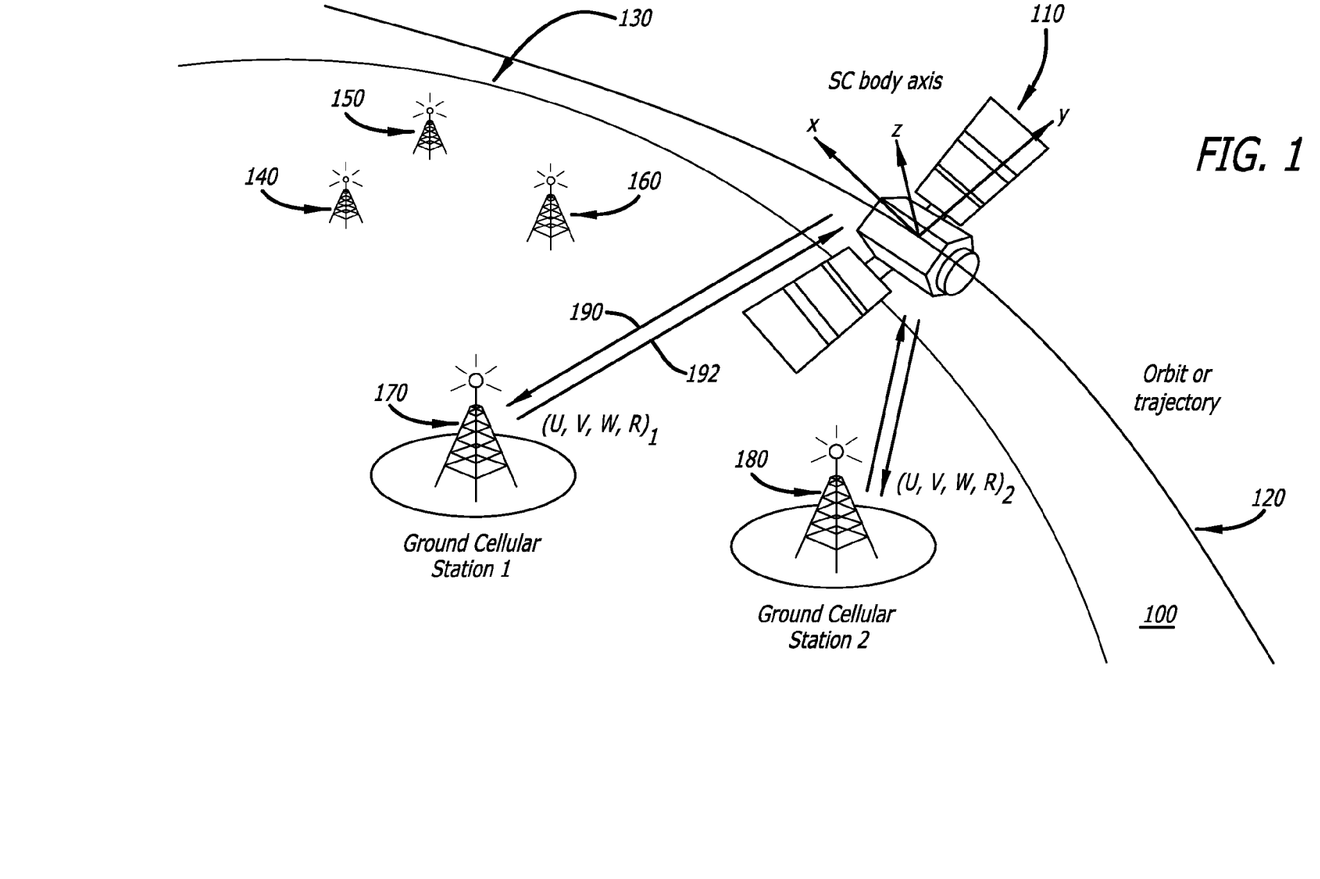
FIG. 1 is a schematic drawing illustrating the operation of the disclosed system for vehicle navigation using cellular networks, in accordance with at least one embodiment of the present disclosure.

FIG. 1 is a schematic drawing illustrating the operation of the disclosed system 100 for vehicle navigation using cellular networks, in accordance with at least one embodiment of the present disclosure. This figure shows a space vehicle (i.e. a satellite) 110 orbiting on an orbital trajectory 120 above Earth 130. The satellite 110 is shown to have a three-dimensional spacecraft (SC) body axis as indicated by the x, y, and z axes. Multiple cellular towers 140, 150, 160, 170, 180, which are part of a cellular network, are shown to be located on the surface of the Earth 130. The satellite 110 is using its vehicle mounted communication system to make navigation assistance measurements using two of the cellular towers 170, 180. Measurements obtained by using multiple different cellular towers help to provide for an accurate navigation solution.

During operation of the disclosed system, the satellite 110 first measures vehicle inertial motion of the satellite 100 by using an inertial measurement unit from its on-board inertial navigation system (INS) to determine an estimate of the location of the vehicle (i.e. the satellite) 110. At least one digital computer commands an on-board controller (e.g., a two-axis servo loop controller) to steer the on-board transmit antenna and to steer the on-board receive antenna at an angle such that both the transmit antenna and the receive antenna are pointed towards a first cellular tower (e.g., cellular tower 170) to make measurements from. In one or more embodiments, at least one digital computer is a digital signal processor (DSP).

In one or more embodiments, the transmit antenna and/or the receive antenna are each a multi-axis gimbal antenna (e.g., a single reflector antenna system or a multi reflector antenna system, such as a dual reflector system that are in, for example, a Gregorian reflector configuration or a Cassegrain reflector configuration). For these embodiments, the on-board controller, for example a two-axis servo loop controller, gimbals at least one reflector for both the transmit antenna and the receive antenna in order to point the transmit antenna and the receive antenna to the cellular tower. In other embodiments, the transmit antenna and/or the receive antenna are a phased array antenna with electronic beam steering. For these embodiments, the controller electronically steers the phased array antenna by causing the phase across the face of the antenna to change. In alternative embodiments, the transmit antenna and/or the receive antenna are a multi-feed array antenna that is mounted on a platform. For these embodiments, the controller electronically steers the multi-feed array antenna by gimballing the platform accordingly.

After the transmit antenna and the receive antenna are pointed towards the cellular tower 170, the transmit antenna on the satellite 110 transmits a radio frequency (RF) transmit signal 190 to the cellular tower 170 requesting the cell identification (CID) number of the cellular tower 170 (i.e. the transmit antenna interrogates the cellular tower 170 for its CID). In response, the cellular tower 170 transmits a RF receive signal 192 to the satellite 110. The receive signal 192 contains the CID of the cellular tower 170. The receive antenna on the satellite 110 receives the receive signal 192.

After the receive signal 192 is received, at least one digital computer determines the location of the cellular tower 170 by looking up the CID of the cellular tower 170 on a lookup table, which has been previously loaded (e.g., loaded prior to flight) to a database on the digital computer of the satellite 110. The lookup table, in the database on the digital computer, contains a listing of CIDs along with the locations of their corresponding cellular towers. In particular, the lookup table provides a known two-dimensional location (e.g., latitude and longitude) for the cellular tower 170, or provides a known three-dimensional location (e.g., latitude, longitude, and height relating to a geodetic height reference; or U, V, W coordinates of an Earth coordinate system). In one or more embodiments, the contents of the lookup table may be updated (e.g., by an algorithm located on a database on the digital computer of the satellite 110) periodically during flight. For example, the lookup table may be updated (e.g., by the algorithm) by adding new CIDs for new cellular towers to the lookup table, by deleting old CIDs for cellular towers that are no longer in use, and by correcting the location information for CIDs for any cellular towers with incorrect location information. In one or more embodiments, an algorithm located on a database on the digital computer of the satellite 110 is used to update, refresh, and maintain the database of the lookup table.

In addition, during operation of the disclosed system, at least one digital computer also determines the difference in time (T) from the time (T1) the transmit signal 190 was sent by the transmit antenna to the time (T2) the receive signal 192 was received by the receive antenna (i.e. T=T2−T1). At least one digital computer calculates the distance (i.e., makes a ranging calculation) (R) from the satellite 110 to the cellular tower 170 by using the difference in time (T). At least one digital computer also estimates the satellite's 110 position relative to the cellular tower 170 by using the angle data taken from the transmit and receive antenna gimbal as well as by using the determined distance (R) from the ranging measurements. Then, at least one digital computer uses a Kalman filter to refine the initial INS estimate of the vehicle 110 location by using the location of the cellular tower 170 from the lookup table, the distance (determined from ranging measurements) (R) from the satellite 110 to the cellular tower 170, and the gimbal angle of the transmit antenna and the receive antenna.

After the estimate of the vehicle 110 location is refined, at least one digital computer commands an on-board controller to steer the on-board transmit antenna and to steer the on-board receive antenna at an angle such that both the transmit antenna and the receive antenna are pointed towards a second cellular tower (e.g., cellular tower 180) to make measurements from, and the process repeats. The more cellular towers the satellite 110 is able to make measurements from, the more refined and accurate the estimate of the vehicle 110 location will be.

Figure 2:
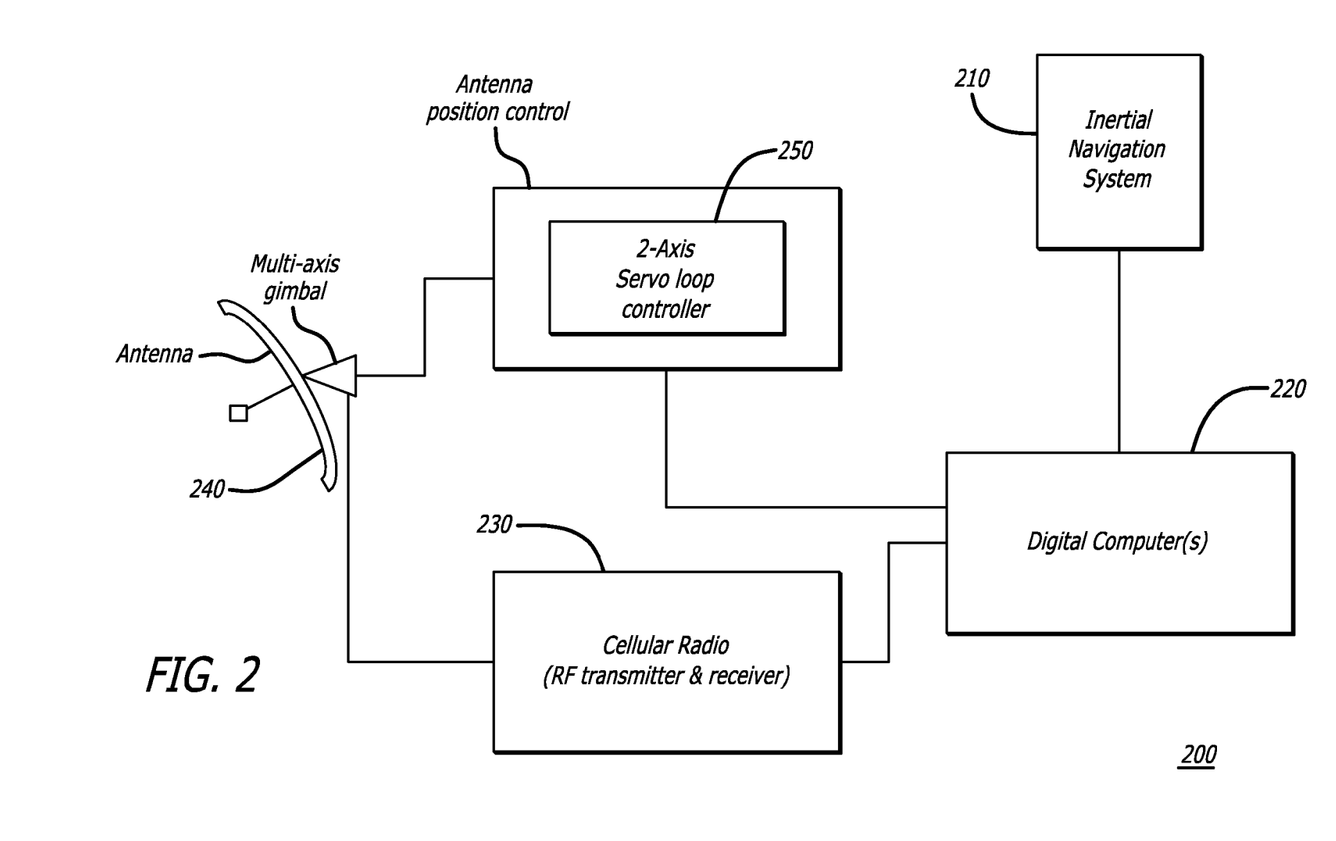
FIG. 2 is a block diagram depicting components of the navigation system of the satellite shown in FIG. 1, in accordance with at least one embodiment of the present disclosure.

FIG. 2 is a block diagram 200 depicting components of the navigation system of the satellite 110 shown in FIG. 1, in accordance with at least one embodiment of the present disclosure. In this figure, the on-board components of the satellite 110 that are used to provide navigation to the satellite 110 are shown to include an inertial navigation system (INS) 210, a digital computer(s) 220, a cellular radio RF transmitter and receiver 230 (or alternatively a transceiver), an multi-axis gimbal antenna system 240 (which includes the transmit antenna and the receive antenna), a two-axis servo loop controller 250. The digital computer(s) 220 is connected, either by wire or wirelessly, to the INS 210, to the cellular radio RF transmitter and receiver 230, and to the two-axis servo loop controller 250. The multi-axis gimbal antenna system 240 is connected, either by wire or wirelessly, to the two-axis servo loop controller 250 and to the cellular radio RF transmitter and receiver 230.

In order to better understand the interactions between the components depicted in FIG. 2, a brief summary of the process is provided. As such, as previously discussed above, the INS 210 provides an initial estimate of the location of the satellite 110 to the digital computer(s) 220. The digital computer(s) 220 determines which cellular tower the transmit antenna 240 and the receive antenna 240 should points towards by algorithmically choosing the cellular tower that will provide the most accurate measurements to help to refine the INS location estimate of the satellite 110. Once the digital computer(s) 220 determines which cellular tower the transmit and receive antenna 240 should point towards, the digital computer(s) 220 sends a command (i.e. a signal) to the two-axis servo loop controller 250 with instructions on how to command the transmit and receive antenna 240 to gimbal, such that the transmit and receive antenna 240 are pointed towards the chosen cellular tower.

After the two-axis servo loop controller 250 receives the gimballing instructions from the digital computer(s) 220, the two-axis servo loop controller 250 sends a pointing (or gimballing) command (i.e. a signal) to the transmit and receive antenna 240. In response to receiving the pointing (or gimballing) command, the transmit and receive antenna 240 gimbal accordingly.

The digital computer(s) then sends a command to the transmitter 230 to send a transmit signal via the transmit antenna 240 to the cellular tower (not shown) requesting the CID of the cellular tower. In response, the cellular tower sends a receive signal to the satellite 110 containing the CID of the cellular tower. The receiver 230 of the satellite 110 then receives the receive signal via the receive antenna 240. After the receiver 230 receives the receive signal, the receiver 230 sends the receive signal containing the CID of the cellular tower to the digital computer(s) 220 for processing.

Figure 3:
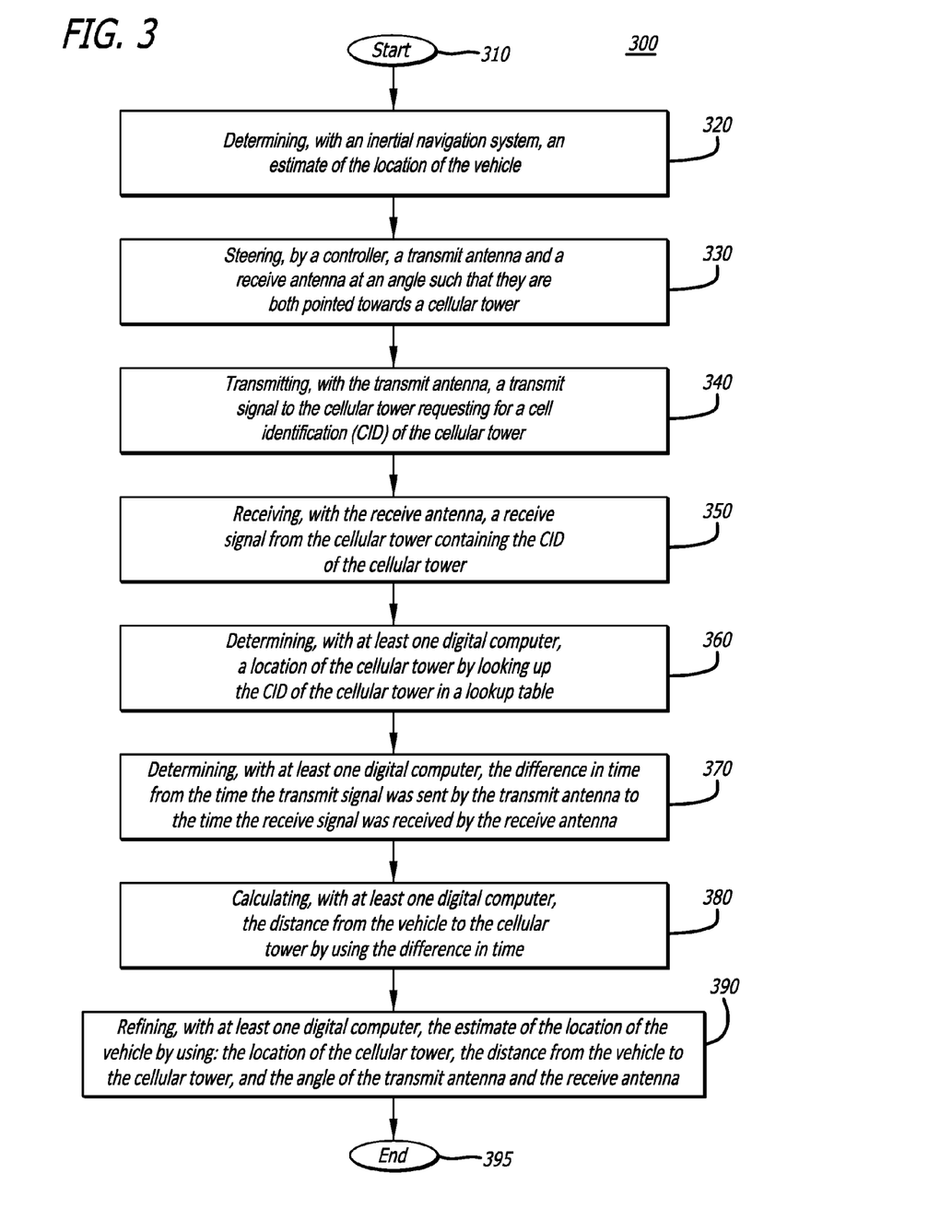
FIG. 3 is a flow diagram of the disclosed method for vehicle navigation using cellular networks, in accordance with at least one embodiment of the present disclosure.

FIG. 3 is a flow diagram of the disclosed method 300 for vehicle navigation using cellular networks, in accordance with at least one embodiment of the present disclosure. At the start 310 of the method 300, an inertial navigation system determines an estimate of a location of a vehicle (e.g., a satellite) 320. Then, a controller steers a transmit antenna and a receive antenna at an angle such that they are both pointed towards a cellular tower 330. After the transmit antenna and a receive antenna are steered towards a cellular tower, the transmit antenna transmits a transmit signal to the cellular tower requesting for a cell identification (CID) of the cellular tower 340. Then, the receive antenna receives a receive signal from the cellular tower containing the CID of the cellular tower 350.

After the receive antenna receives the receive signal, at least one digital computer determines a location of the cellular tower by looking up the CID of the cellular tower in a lookup table 360. At least one digital computer then determines a difference in time from the time the transmit signal was sent by the transmit antenna to the time the receive signal was received by the receive antenna 370. After at least one digital computer determines the difference in time, at least one digital computer calculates a distance from the vehicle to the cellular tower by using the difference in time 380. Then at least one digital computer refines the estimate of the location of the vehicle by using the location of the cellular tower, the distance from the vehicle to the cellular tower, and the angle of the transmit antenna and the receive antenna 390. After the location estimate is refined, the method 300 ends 395.

Figure 4:
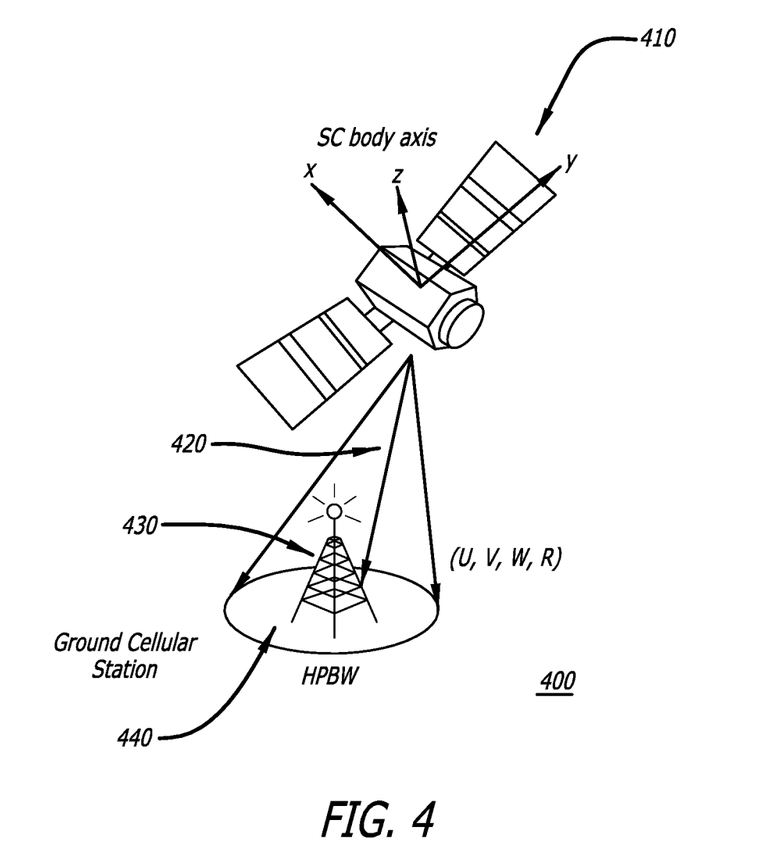
FIG. 4 is a schematic diagram showing a satellite radiating a beam over a cellular tower, in accordance with at least one embodiment of the present disclosure.

FIG. 4 is a schematic diagram 400 showing a satellite 410 radiating a beam 420 over a cellular tower 430, in accordance with at least one embodiment of the present disclosure. In particular, in this figure, the cellular tower 430 is shown to be located within the half power beam width (HPBW) footprint 440 of the beam 420. In one or more embodiments, at least one digital computer on the satellite 110 determines which cellular tower to steer the transmit and receive antenna towards by measuring the amplitudes of signals received from various cellular towers (i.e. by "sniffing" for signals transmitted from previously unknown cell towers). This is done by receiving, by the receive antenna, signals emitted from Earth during the satellite 110 orbiting one or more passes over regions on the Earth. At least one digital computer uses an algorithm to analyze all of the received signals to determine if a previously unknown cellular tower(s) is located nearby on Earth below. The digital computer(s) will choose to steer the transmit and receive antenna towards cellular towers radiating strong and stable RF signals, which will help to provide a more accurate estimate of the satellite's 410 location. For cold initialization cases or lost conditions, at least one digital computer will cause the transmit and receive antenna to scan across the Earth to look for cellular towers and/or to identify new cellular towers as needed.

It should be noted that, in one or more embodiments, in order to mitigate adjacent channel interference, which may be caused by the overlapping of the beams being transmitted at the same frequency from the cellular towers on Earth that are located in close proximity to one another, various different techniques may be employed. One technique is to have the beams employ code division multiple access (CDMA) or equivalent codes in order to distinguish the beams. Another technique that may be employed is to shape the transmission beams such that they each have a sharp roll-off antenna pattern (i.e. the beams are shaped to be narrow and focused beams). Also, another technique that may be employed is to modify the pointing angles of the beams to mask interfering stations.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for navigation of a vehicle using cellular networks, the method comprising:
    transmitting, with a transmit antenna associated with the vehicle, a transmit signal to a cellular tower;
    receiving, with a receive antenna associated with the vehicle, a receive signal from the cellular tower containing a cell identification (CID) of the cellular tower;
    determining, with at least one computer, a location of the cellular tower by looking up the CID of the cellular tower in a lookup table;
    determining, with the at least one computer, a difference in time from a time the transmit signal was sent by the transmit antenna to a time the receive signal was received by the receive antenna;
    calculating, with the at least one computer, a distance from the vehicle to the cellular tower by using the difference in time; and
    refining, with the at least one computer, an estimate of a location of the vehicle by using the location of the cellular tower, the distance from the vehicle to the cellular tower, and an angle of the transmit antenna and the receive antenna such that they are both pointed towards the cellular tower.

2. The method of claim 1, wherein the vehicle is one of a space vehicle, a satellite, an aircraft, a missile, a marine vehicle, and a terrestrial vehicle.

3. The method of claim 1, wherein the method further comprises determining, with an inertial navigation system, the estimate of the location of the vehicle.

4. The method of claim 1, wherein the method further comprises steering, by a controller, the transmit antenna and the receive antenna to the angle such that they are both pointed towards the cellular tower.

5. The method of claim 4, wherein the steering of the transmit antenna and the receive antenna at the angle such that they are both pointed towards the cellular tower is based on an amplitude of the receive signal.

6. The method of claim 4, wherein the method further comprises determining, by the at least one computer, the cellular tower to steer towards by algorithmically choosing the cellular tower that will provide the best accuracy to refine the estimate of the location of the vehicle.

7. The method of claim 1, wherein the transmit signal comprises a request for the CID of the cellular tower.

8. The method of claim 1, wherein the transmit antenna and the receive antenna are each at least one of a single reflector antenna, a multi-reflector antenna, a phased array antenna, a multi-feed array antenna, and a phased array fed reflector antenna.

9. The method of claim 8, wherein, when the transmit antenna and the receive are each one of a single reflector antenna and a multi-reflector antenna, the transmit antenna and the receive antenna are capable of being steered by gimballing at least one of the reflector.

10. The method of claim 1, wherein the transmit antenna and the receive antenna are housed on the vehicle.

11. The method of claim 1, wherein the location of the cellular tower is specified in the lookup table in one of two dimensions and three dimensions.

12. The method of claim 1, wherein the method further comprises updating the lookup table by at least one of adding new CIDs to the lookup table, deleting CIDs that are no longer used from the lookup table, and correcting the location of at least one cellular tower corresponding to a CID in the lookup table.

13. The method of claim 1, wherein the at least one computer utilizes a Kalman filter to refine the estimate of the location of the vehicle.

14. A system for navigation of a vehicle using cellular networks, the system comprising:
    a transmit antenna, associated with the vehicle, to transmit a transmit signal to a cellular tower;
    a receive antenna, associated with the vehicle, to receive a receive signal from the cellular tower containing a cell identification (CID) of the cellular tower; and
    at least one computer to determine a location of the cellular tower by looking up the CID of the cellular tower in a lookup table; to determine a difference in time from a time the transmit signal was sent by the transmit antenna to a time the receive signal was received by the receive antenna; to calculate a distance from the vehicle to the cellular tower by using the difference in time; and to refine an estimate of a location of the vehicle by using the location of the cellular tower, the distance from the vehicle to the cellular tower, and an angle of the transmit antenna and the receive antenna such that they are both pointed towards the cellular tower.

15. The system of claim 14, wherein the vehicle is one of a space vehicle, a satellite, an aircraft, a missile, a marine vehicle, and a terrestrial vehicle.

16. The system of claim 14, wherein the system further comprises an inertial navigation system to determine the estimate of the location of the vehicle.

17. The system of claim 14, wherein the system further comprises a controller to steer the transmit antenna and the receive antenna to the angle such that they are both pointed towards the cellular tower.

18. The system of claim 17, wherein the at least one computer is further to determine the cellular tower to point towards by algorithmically choosing the cellular tower that will provide the best accuracy to refine the estimate of the location of the vehicle.

19. The system of claim 14, wherein the transmit signal comprises a request for the CID of the cellular tower.

20. An apparatus for navigation of a vehicle using cellular networks, the apparatus comprising:
- a transmit antenna to transmit a transmit signal to a cellular tower;
- a receive antenna to receive a receive signal from the cellular tower containing a cell identification (CID) of the cellular tower; and
- at least one computer to determine a location of the cellular tower by looking up the CID of the cellular tower in a lookup table; to determine a difference in time from a time the transmit signal was sent by the transmit antenna to a time the receive signal was received by the receive antenna; to calculate a distance from the vehicle to the cellular tower by using the difference in time; and to refine an estimate of a location of the vehicle by using the location of the cellular tower, the distance from the vehicle to the cellular tower, and an angle of the transmit antenna and the receive antenna such that they are both pointed towards the cellular tower.

* * * * *